(12) United States Patent
Zwiebel et al.

(10) Patent No.: US 7,855,950 B2
(45) Date of Patent: Dec. 21, 2010

(54) CONGRUENT FORWARDING PATHS FOR UNICAST AND MULTICAST TRAFFIC

(75) Inventors: John M. Zwiebel, Santa Cruz, CA (US); Ali Sajassi, San Ramon, CA (US); Dino Farinacci, San Jose, CA (US); Daniel Alvarez, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 629 days.

(21) Appl. No.: 11/296,149

(22) Filed: Dec. 7, 2005

(65) Prior Publication Data

US 2007/0025276 A1 Feb. 1, 2007

Related U.S. Application Data

(60) Provisional application No. 60/704,817, filed on Aug. 1, 2005.

(51) Int. Cl.
*G01R 31/08* (2006.01)
*H04L 12/28* (2006.01)
*H04H 20/71* (2008.01)
*G06F 15/16* (2006.01)

(52) U.S. Cl. .............. 370/216; 370/256; 370/312; 370/389; 709/204; 709/230

(58) Field of Classification Search .............. None
See application file for complete search history.

(56) References Cited

U.S. PATENT DOCUMENTS

| | | | |
|---|---|---|---|
| 5,331,637 A * | 7/1994 | Francis et al. ............. | 370/408 |
| 5,818,842 A | 10/1998 | Burwell et al. | |
| 5,848,277 A | 12/1998 | Javernick et al. | |
| 6,073,176 A | 6/2000 | Baindur et al. | |
| 6,188,694 B1 | 2/2001 | Fine et al. | |
| 6,301,244 B1 | 10/2001 | Huang et al. | |
| 6,304,575 B1 | 10/2001 | Carroll et al. | |
| 6,308,282 B1 | 10/2001 | Huang | |
| 6,373,838 B1 | 4/2002 | Law et al. | |
| 6,424,657 B1 | 7/2002 | Voit et al. | |

(Continued)

OTHER PUBLICATIONS

Lahti "Quality of Service in the Poin-to-Point Protocol over Ethernet" in: Google Scholar (on line, Oct. 2000.

(Continued)

*Primary Examiner*—Huy D Vu
*Assistant Examiner*—Brandon Renner
(74) *Attorney, Agent, or Firm*—The Law Offices of Bradley J. Bereznak

(57) ABSTRACT

A mechanism that provides congruent forwarding paths for unicast and multicast data traffic over a service provider core network includes issuing, by a receiver edge node, a request to join a multicast tree structure. A unicast path from the receiver edge node to a source node of the provider network is then established using a special message that contains an identifier. The identifier allows the unicast path through the core network to be aligned with the multicast tree structure. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

9 Claims, 4 Drawing Sheets

U.S. PATENT DOCUMENTS

| | | |
|---|---|---|
| 6,430,621 B1 | 8/2002 | Srikanth et al. |
| 6,484,209 B1 | 11/2002 | Momirov |
| 6,502,140 B1 * | 12/2002 | Boivie ................ 709/238 |
| 6,519,231 B1 | 2/2003 | Ding et al. |
| 6,611,869 B1 | 8/2003 | Eschelbeck et al. |
| 6,665,273 B1 | 12/2003 | Goguen et al. |
| 6,667,982 B2 | 12/2003 | Christie et al. |
| 6,668,282 B1 | 12/2003 | Booth, III et al. |
| 6,693,878 B1 | 2/2004 | Daruwalla et al. |
| 6,732,189 B1 | 5/2004 | Novaes |
| 6,763,469 B1 | 7/2004 | Daniely |
| 6,785,232 B1 | 8/2004 | Kotser et al. |
| 6,785,265 B2 | 8/2004 | White et al. |
| 6,789,121 B2 | 9/2004 | Lamberton et al. |
| 6,798,775 B1 | 9/2004 | Bordonaro |
| 6,801,533 B1 | 10/2004 | Barkley |
| 6,813,268 B1 | 11/2004 | Kalkunte et al. |
| 6,826,698 B1 | 11/2004 | Minkin et al. |
| 6,829,252 B1 | 12/2004 | Lewin et al. |
| 6,839,348 B2 | 1/2005 | Tang et al. |
| 6,850,521 B1 | 2/2005 | Kadambi et al. |
| 6,850,542 B2 | 2/2005 | Tzeng |
| 6,852,542 B2 | 2/2005 | Mandel et al. |
| 6,882,643 B1 | 4/2005 | Mauger et al. |
| 6,892,309 B2 | 5/2005 | Richmond et al. |
| 6,954,436 B1 | 10/2005 | Yip |
| 7,009,983 B2 | 3/2006 | Mancour |
| 7,092,389 B2 | 8/2006 | Chase et al. |
| 7,113,512 B1 | 9/2006 | Holmgren et al. |
| 7,116,665 B2 | 10/2006 | Balay et al. |
| 7,173,934 B2 | 2/2007 | Lapuh et al. |
| 7,277,936 B2 * | 10/2007 | Frietsch ................ 709/223 |
| 7,310,342 B2 | 12/2007 | Rouleau |
| 7,345,991 B1 | 3/2008 | Shabtay et al. |
| 7,408,936 B2 | 8/2008 | Ge et al. |
| 7,466,703 B1 | 12/2008 | Arunachalam et al. |
| 7,596,595 B2 * | 9/2009 | Budge et al. ............ 709/204 |
| 7,606,187 B2 * | 10/2009 | Zeng et al. ............. 370/312 |
| 7,626,984 B2 * | 12/2009 | Napierala .............. 370/389 |
| 2002/0032780 A1 | 3/2002 | Moore et al. |
| 2002/0087721 A1 | 7/2002 | Sato et al. |
| 2002/0156612 A1 | 10/2002 | Schulter et al. |
| 2002/0196795 A1 | 12/2002 | Higashiyama |
| 2003/0012183 A1 | 1/2003 | Butler |
| 2003/0036375 A1 | 2/2003 | Chen et al. |
| 2003/0101243 A1 | 5/2003 | Donahue et al. |
| 2003/0110268 A1 | 6/2003 | Kermarec et al. |
| 2003/0112781 A1 | 6/2003 | Kermode et al. |
| 2003/0142674 A1 | 7/2003 | Casey |
| 2003/0154259 A1 | 8/2003 | Lamberton et al. |
| 2003/0177221 A1 | 9/2003 | Ould-Brahim et al. |
| 2004/0095940 A1 | 5/2004 | Yuan et al. |
| 2004/0102182 A1 | 5/2004 | Reith et al. |
| 2004/0107382 A1 | 6/2004 | Doverspike et al. |
| 2004/0125809 A1 | 7/2004 | Jeng |
| 2004/0133619 A1 | 7/2004 | Zelig et al. |
| 2004/0141501 A1 | 7/2004 | Adams et al. |
| 2004/0151180 A1 | 8/2004 | Hu et al. |
| 2004/0158735 A1 | 8/2004 | Roese |
| 2004/0165525 A1 | 8/2004 | Burak |
| 2004/0165600 A1 | 8/2004 | Lee |
| 2004/0172559 A1 | 9/2004 | Luo et al. |
| 2004/0228291 A1 | 11/2004 | Huslak et al. |
| 2004/0233891 A1 | 11/2004 | Regan et al. |
| 2004/0264364 A1 | 12/2004 | Sato |
| 2005/0007951 A1 | 1/2005 | Lapuh et al. |
| 2005/0025143 A1 | 2/2005 | Chen et al. |
| 2005/0030975 A1 | 2/2005 | Wright et al. |
| 2005/0044265 A1 | 2/2005 | Vinel et al. |
| 2005/0063397 A1 | 3/2005 | Wu et al. |
| 2005/0068972 A1 | 3/2005 | Burns et al. |
| 2005/0089047 A1 | 4/2005 | Ould-Brahim et al. |
| 2005/0099949 A1 | 5/2005 | Mohan et al. |
| 2005/0152370 A1 | 7/2005 | Meehan et al. |
| 2005/0157664 A1 | 7/2005 | Baum |
| 2005/0157751 A1 | 7/2005 | Rabie et al. |
| 2005/0163049 A1 | 7/2005 | Yazaki et al. |
| 2005/0175022 A1 | 8/2005 | Nishimura et al. |
| 2005/0190773 A1 | 9/2005 | Yang et al. |
| 2005/0239445 A1 | 10/2005 | Karaoguz et al. |
| 2005/0249124 A1 | 11/2005 | Elie-Dit-Cosaque et al. |
| 2005/0286503 A1 | 12/2005 | Oda et al. |
| 2006/0007867 A1 | 1/2006 | Elie-Dit-Cosaque et al. |
| 2006/0018253 A1 * | 1/2006 | Windisch et al. ........... 370/216 |
| 2006/0092847 A1 | 5/2006 | Mohan |
| 2006/0182037 A1 | 8/2006 | Chen et al. |
| 2006/0187950 A1 * | 8/2006 | Bou-Diab et al. .......... 370/432 |
| 2006/0248277 A1 | 11/2006 | Pande |
| 2006/0285500 A1 | 12/2006 | Booth |
| 2006/0285501 A1 | 12/2006 | Damm |
| 2007/0025276 A1 * | 2/2007 | Zwiebel et al. ............ 370/256 |

OTHER PUBLICATIONS

<URL:http://www.e.kth.se/~e95_pla/exjobb/doc/Lahti_Thesis_QoS_in_PPPoE.pdf>) Oct. 1, 2000.

* cited by examiner

US 7,855,950 B2

CONGRUENT FORWARDING PATHS FOR UNICAST AND MULTICAST TRAFFIC

RELATED APPLICATIONS

This application claims the benefit of U.S. Provisional Patent Application No. 60/704,817 filed Aug. 1, 2005, entitled "Multicast Mechanism For VPLS". The present application is also related to co-pending application entitled, "Optimal Bridging Over MPLS/IP Through Alignment of Multicast and Unicast Paths" filed concurrently herewith, which application is assigned to the assignee of the present application.

FIELD OF THE INVENTION

The present invention relates generally to digital computer network technology; more particularly, to methods and apparatus for providing Local Area Network (LAN) emulation services over Internet protocol (IP) networks.

BACKGROUND OF THE INVENTION

A LAN is a high-speed network (typically 10 to 1000 Mbps) that supports many computers connected over a limited distance (e.g., under a few hundred meters). Typically, a LAN spans a single building. U.S. Pat. No. 6,757,288 provides a general description of a LAN segment. A Virtual Local Area Network (VLAN) is mechanism by which a group of devices on one or more LANs are configured using management software so that they can communicate as if they were attached to the same LAN, when in fact they are located on a number of different LAN segments. Because VLANs are based on logical instead of physical connections, they are extremely flexible.

Virtual Private Network (VPN) services provide secure network connections between different locations. A company, for example, can use a VPN to provide secure connections between geographically dispersed sites that need to access the corporate network. There are three types of VPN that are classified by the network layer used to establish the connection between the customer and provider network: Layer 1, VPNs, which are simple point-to-point connections using Layer 1 circuits such as SONET; Layer 2 VPNs (L2VPNs), where the provider delivers Layer 2 circuits to the customer (one for each site) and provides switching of the customer data; and Layer 3 VPNs (L3VPNs), where the provider edge (PE) device participates in the customer's routing by managing the VPN-specific routing tables, as well as distributing routes to remote sites. In a Layer 3 IP VPN, customer sites are connected via IP routers, e.g., provider edge (PE) and intermediate provider (P) nodes, that can communicate privately over a shared backbone as if they are using their own private network. Multi-protocol label switching (MPLS) Border Gateway Protocol (BGP) networks are one type of L3VPN solution. An example of an IP-based Virtual Private Network is disclosed in U.S. Pat. No. 6,693,878. U.S. Pat. No. 6,665,273 describes a MPLS system within a network device for traffic engineering.

Virtual Private LAN Service (VPLS) has recently emerged as a L2VPN to meet the need to connect geographically dispersed locations with a protocol-transparent, any-to-any, full-mesh service. VPLS is an architecture that delivers Layer 2 service that in all respects emulates an Ethernet LAN across a wide area network (WAN) and inherits the scaling characteristics of a LAN. All customer sites in a VPLS appear to be on the same LAN, regardless of their locations. In other words, with VPLS, customers can communicate as if they were connected via a private Ethernet LAN segment. The basic idea behind VPLS is to set up a full-mesh of label switched paths (LSPs) between each PE router so that Media Access Control (MAC) frames received on the customer side can be switched based on their MAC addresses and then encapsulated into MPLS/IP packets on the P node side and sent across the VPLS domain over the full mesh. Conceptually, VPLS can therefore be thought of as an emulated Ethernet LAN segment connected by a set of virtual bridges or virtual Ethernet switches.

In multicast data transmission, data packets originating from a source node are delivered to a group of receiver nodes through a tree structure. (In contrast, unicast communications take place between a single sender and a single receiver.) Various mechanisms, such as the Protocol Independent Multicast (PIM) protocol, have been developed for establishing multicast distribution trees and routing packets across service provider (SP) networks. One commonly used approach uses a dynamic routing algorithm to build the multicast tree by allowing group member receiver nodes to join one-by-one. When a new receiver node attempts to join, it sends a Join request message along a computed path to join the group. The routing algorithm/protocol then connects the new receiver to the exiting tree (rooted at the source) without affecting the other tree member nodes.

By way of further background, U.S. Pat. No. 6,078,590 teaches a method of routing multicast packets in a network. Content-based filtering of multicast information is disclosed in U.S. Pat. No. 6,055,364.

Recent VPLS working group drafts (draft-ieff-l2vpn-vpls-ldp-07.txt and draft-ieff-l2vpn-vpls-bgp-05) have no special handling specified for multicast data within a VPLS instance. That is, multicast data within a VPLS instance is treated the same as broadcast data and it is replicated over all the pseudowires (PWs) belonging to that VPLS instance at the ingress provider edge (PE) device. This ingress replication is very inefficient in terms of ingress PE and MPLS/IP core network resources. Furthermore, it is not viable for high bandwidth applications where replicating the multicast data N times may exceed the throughput of the ingress PE trunk. Therefore, SPs are interested in deploying multicast mechanisms in their VPLS-enabled networks that can reduce or eliminate ingress replication, e.g., either replicating the data over the PWs to the PE devices that are member of the multicast group(s) or only sending one copy of the data over each physical link among PE and P nodes destined to the PE devices that are member of the multicast group(s).

Two submissions in the Internet Engineering Task Force (IETF) L2VPN Working Group attempt to solve this problem. The first one (specified in draft-serbest-l2vpn-vpls-mcast-03.txt) uses Internet Group Management Protocol (IGMP)/PIM snooping to restrain multicast traffic over a full mesh of PWs belonging to a given VPLS. IGMP is a standard for IP multicasting in the Internet, and is defined in Request For Comments 1112 (RFC1112) for IGMP version 1 (IGMPv1), in RFC2236 for IGMPv2, and in RFC3376 for IGMPv3. (IGMPv3 includes a feature called Source Specific Multicast (SSM) that adds support for source filtering.) By snooping IGMP/PIM messages, the PE (i.e., switch or router) node can populate the Layer 2 (L2) forwarding table based on the content of the intercepted packets. Thus, a PE device can determine which PWs should be included in a multicast group for a given VPLS instance and only replicate the multicast data stream over that subset of PWs.

Although IGMP snooping helps to alleviate replication overhead, it does not completely eliminate the replication problem at the ingress PE. Therefore, this mechanism may not be viable for multicast applications with high bandwidth requirements because the aggregate data throughput after replication may exceed the bandwidth of the physical trunk at the ingress PE.

The second IETF proposal (described in draft-raggarwa-l2vpn-vpls-mcast-01.txt) tries to address the shortcomings of the previous draft by using the multicast tree to transport customer multicast data of a given VPLS service instance. However, because the unicast and multicast paths for a given VPLS instance are different, this approach can result in numerous problems. The first problem involves packet re-ordering, wherein two consecutive frames are sent on two different paths, e.g., a first frame is sent on a multicast path because of unknown destination unicast MAC address, with a second frame being sent on a unicast path after the path to the destination has been learned. If the unicast path is shorter than multicast path, the second packet can arrive ahead of the first one.

Another problem with the second. IETF proposal is that bridged control packets typically need to take the same path as unicast and multicast data, which means the unicast and multicast path need to be aligned or congruent. If control packets are sent on unicast paths, any failure in the multicast path can go undetected. This situation is illustrated in FIG. 1, which shows a SP network 10 with a multicast tree 18 having a path through P nodes 14, 15, and 17 that connects PE nodes 11-13. A unicast path 19 is shown passing through P node 16. In this example, failure of P node 15 may go undetected if control packets are sent via unicast path 19. Furthermore, since unicast and multicast paths are usually different in the network core, Ethernet operations, administration, and management (OAM) connectivity check messages often cannot detect a path/node failure. Even if the failure is detected through some other means, notification of the failure to the originator of the Ethernet OAM becomes problematic.

What is needed therefore is a method and apparatus for eliminating ingress replication of multicast data within a VPLS instance that overcomes the aforementioned problems of the prior art.

BRIEF DESCRIPTION OF THE DRAWINGS

The present invention will be understood more fully from the detailed description that follows and from the accompanying drawings, which, however, should not be taken to limit the invention to the specific embodiments shown, but are for explanation and understanding only.

DETAILED DESCRIPTION

A mechanism for aligning unicast and multicast paths in a service provider network, and which thereby achieves shortest path (i.e., optimal) bridging, is described. In the following description specific details are set forth, such as device types, protocols, network configurations, etc., in order to provide a thorough understanding of the present invention. However, persons having ordinary skill in the networking arts will appreciate that these specific details may not be needed to practice the present invention.

A computer network is a geographically distributed collection of interconnected subnetworks for transporting data between nodes, such as intermediate nodes and end nodes. A local area network (LAN) is an example of such a subnetwork; a plurality of LANs may be further interconnected by an intermediate network node, such as a router, bridge, or switch, to extend the effective "size" of the computer network and increase the number of communicating nodes. Examples of the end nodes may include servers and personal computers. The nodes typically communicate by exchanging discrete frames or packets of data according to predefined protocols. In this context, a protocol consists of a set of rules defining how the nodes interact with each other.

Figure 6:
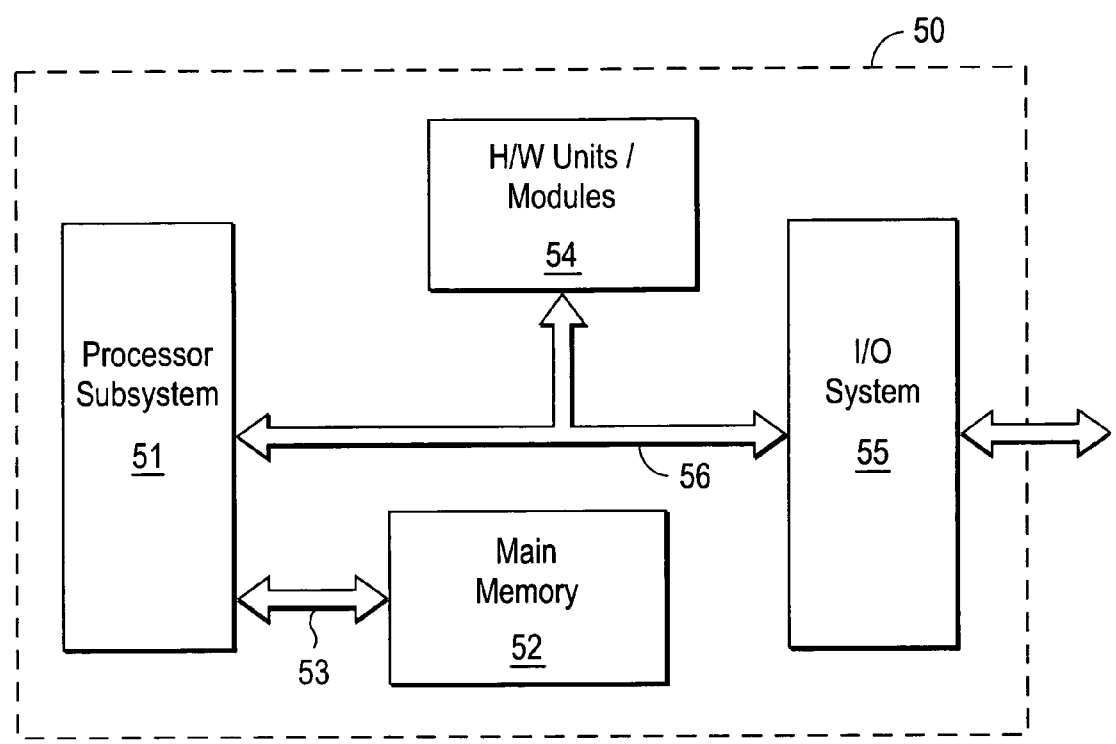
FIG. 6 is a generalized circuit schematic block diagram of a network node.

As shown in FIG. 6, each node 50 typically comprises a number of basic subsystems including a processor subsystem 51, a main memory 52 and an input/output (I/O) subsystem 55. Data is transferred between main memory ("system memory") 52 and processor subsystem 51 over a memory bus 53, and between the processor and I/O subsystems over a system bus 56. Examples of the system bus may include the conventional lightning data transport (or hyper transport) bus and the conventional peripheral component [computer] interconnect (PCI) bus. Node 50 may also comprise other hardware units/modules 54 coupled to system bus 56 for performing additional functions. Processor subsystem 51 may comprise one or more processors and a controller device that incorporates a set of functions including a system memory controller, support for one or more system buses and direct memory access (DMA) engines. In general, the single-chip device is designed for general-purpose use and is not heavily optimized for networking applications.

In a typical networking application, packets are received from a framer, such as an Ethernet media access control (MAC) controller, of the I/O subsystem attached to the system bus. A DMA engine in the MAC controller is provided a list of addresses (e.g., in the form of a descriptor ring in a system memory) for buffers it may access in the system memory. As each packet is received at the MAC controller, the DMA engine obtains ownership of ("masters") the system bus to access a next descriptor ring to obtain a next buffer address in the system memory at which it may, e.g., store ("write") data contained in the packet. The DMA engine may need to issue many write operations over the system bus to transfer all of the packet data.

According to one embodiment of the present invention, congruent (i.e., aligned) unicast and multicast paths through a MPLS/IP network are achieved in the presence of either an asymmetrical path cost or an Equal Cost Multiple Paths (ECMP) through a protocol that allows the multicast tree identifier to be used during establishment of the unicast path. In a particular embodiment, a multicast tree structure is first build using a standard algorithm or protocol. After the multicast tree has been built, a modification to the PIM protocol (for IP) allows unicast paths to be established that align with or follow the multicast tree paths. The modification involves providing the multicast tree identifier information inside the PIM message used during unicast path construction.

In a specific implementation the PIM protocol (with the modification described above) is utilized to set up both the unicast and multicast trees across the P-domain of the SP network. Since in the PIM protocol a join request is initiated from the receiver PE node to the source address of the PE node for the setup of both unicast and multicast paths, the unicast and multicast paths are ensured to be congruent, eliminating the problem of different paths even in the presence of ECMP.

It is appreciated that other protocols, including similar modifications to existing routing protocols such as the Label Distribution Protocol (LDP), for Point-to-Multipoint LSPs as outlined in IETF draft-minei-mpls-ldp-p2mp-00.txt or draft-wijnands-mpls-ldp-mcast-ext-00.txt, can also be used to achieve congruent multicast and unicast paths over the SP network. LDP is a known protocol that uses Transmission Control Protocol (TCP) to provide reliable connections between Label Switching Routers (LSRs) to exchange protocol messages to distribute labels and to set up Label Switched Paths (LSPs). LDP is specified in RFC3479.

The multicast tree identifier utilized when establishing the unicast path may include the multicast group destination address (GDA), which is an IP address from 224.0.0.0 to 239.255.255.255. The tree identifier may also comprise the MAC address associated with each GDA. This MAC address is formed by 01-00-5e, followed by the last 23 bits of the GDA translated into hex (e.g., 230.20.20.20 corresponds to MAC 01-00-5e-14-14-14; and 224.10.10.10 corresponds to MAC 01-00-5e-0a-0a-0a). In other embodiments, the multicast tree identifier may include other information of the multicast tree structure that enables the unicast path to be built congruent with the multicast path.

In one embodiment, the multicast tree is built in a direction opposite to that of data forwarding; that is, if data packets are forwarded in a direction across the SP network from west to east (or left to right in FIGS. 2-5), then the multicast and unicast paths are built in a direction from east to west (right to left).

Figure 1:
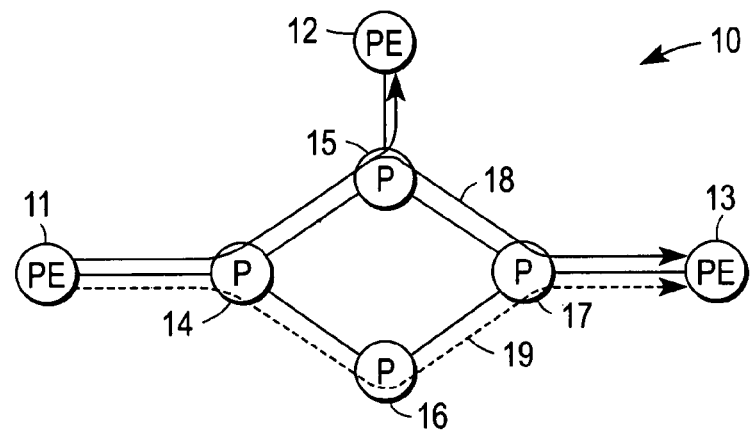
FIG. 1 is a simplified diagram of a provider network showing one problem inherent in the prior art.
Figure 2:
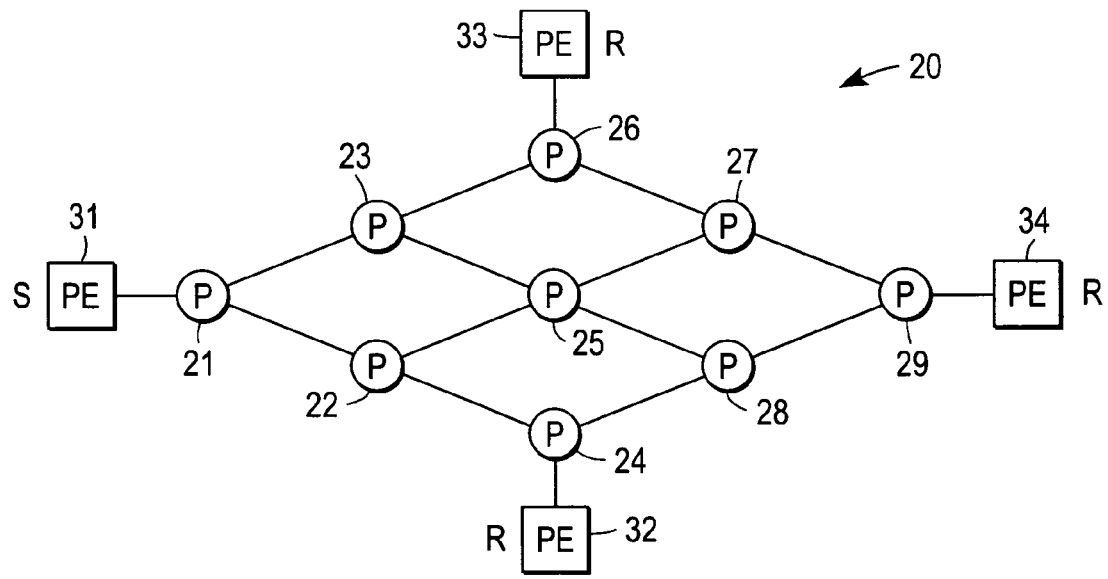
FIG. 2 illustrates an exemplary service provider network with an equal cost multiple path (ECMP) configuration in accordance with one embodiment of the present invention.

FIG. 2 illustrates an exemplary SP network 20 arranged with an equal cost multiple path (ECMP) between PE nodes 31-34 across the P-domain comprising P nodes 21-29. In this example, PE node 31 is shown as the source (S) and PE nodes 32-34 each comprise receiver (R) nodes. (In the context of the present application, a receiver or destination node refers to a router, switch, or other node device that has a multicast group member in its subnet irrespective of how the receiver joins or leaves the group. Similarly, a source node refers to a router, switch, or other node device that has a host in its subnet that is a multicast traffic source.)

Figure 3:
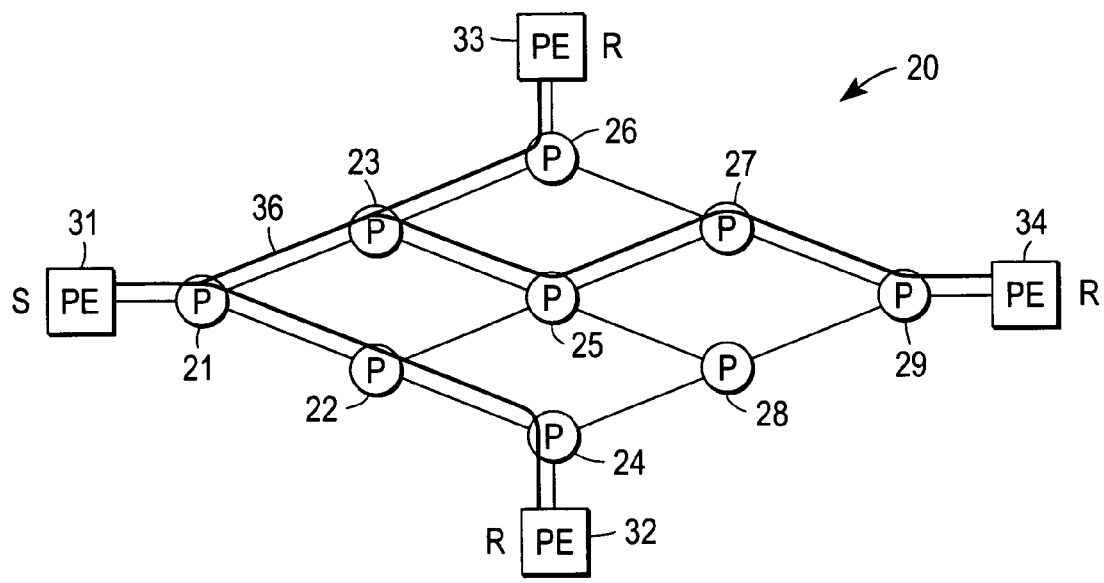
FIG. 3 shows the network diagram of FIG. 2 after formation of a multicast tree in accordance with one embodiment of the present invention.

FIG. 3 shows SP network 20 after a multicast tree 36 having three branches has been established from each of receiver PE nodes 32, 33, and 34 back to source PE node 31. For example, multicast tree 36 includes a branch path from PE node 33 to PE node 31 that passes through P nodes 26, 23 and 21. Similarly, the branch path from receiver PE node 34 to source PE node 31 passes through P nodes 29, 27, 25, 23 and 21. Finally, the branch of multicast tree 36 between PE node 32 and PE node 31 passes through P nodes 24, 22, and 21. In one possible implementation, multicast tree 36 is built by allowing group members to join one-by-one. For instance, the routing algorithm/protocol in use may operate with a receiver join mechanism in which a receiver sends a Join request or message along a computed path to join the multicast tree routed at the source. In this example, each of the branches of tree 36 is established in a direction from right to left in the diagram, i.e., from each receiver PE node to the source root PE node, utilizing receiver-initiated join messages, e.g., PIM-SSM.

Figure 4:
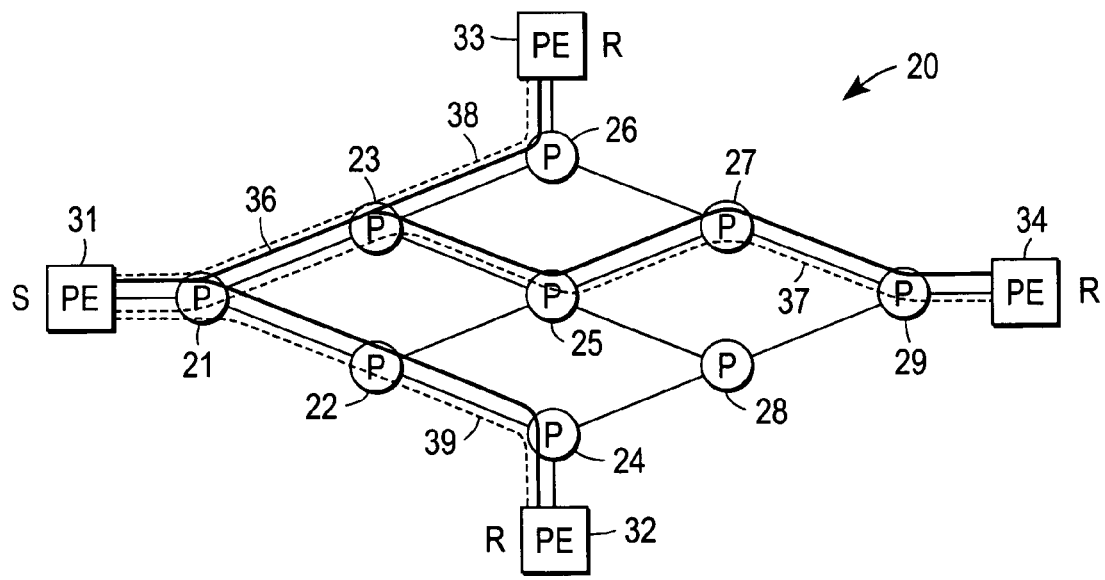
FIG. 4 shows the network-diagram of FIG. 3 after multiple unicast paths have been established in accordance with one embodiment of the present invention.

FIG. 4 shows the network diagram of FIG. 3 after three unicast paths 37-39 (shown by dashed lines as single branch trees from receiver to source) have been established in the same direction that multicast tree 36 was built. That is, in accordance with one embodiment of the present invention, for each unicast path between the receiver node and the source node a separate multicast tree having a single branch is built. (Practitioners will understand that a single-branch tree is the same as a P2P tunnel in MPLS/IP.) Since both unicast and multicast trees are built the same way and in the same direction, both take the same path through the core network of P nodes. As discussed above, this is achieved through a modification to the PIM protocol wherein the multicast tree identifier is provided in the PIM message when establishing each of the unicast paths.

For example, when establishing unicast path 37 from receiver PE node 34 the multicast tree identifier provided in the PIM message provides information on the multicast path such that unicast path 37 is built as a single branch tree from receiver node 34 to source PE node 31 that passes through P nodes 29, 27, 25, 23, and 21 congruent with the corresponding branch of multicast tree 36. Likewise, unicast path 38 is built as a single branch tree from receiver node 33 to source PE node 31 through P nodes 26, 23, and 21; and unicast path 39 is built as a single branch tree from receiver node 32 to source PE node 31 through P nodes 24, 22, and 21.

Figure 5:
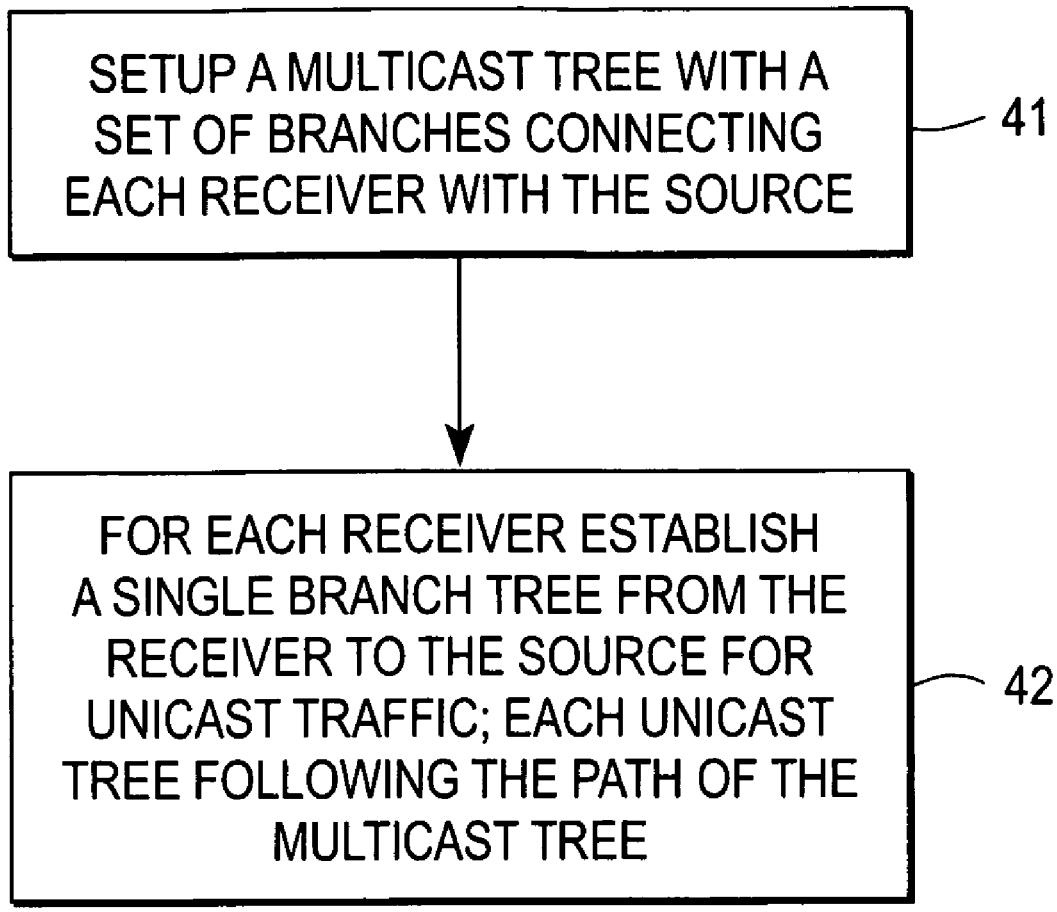
FIG. 5 is a flow chart diagram of network operations in accordance with one embodiment of the present invention.

FIG. 5 is a flow chart diagram of network operations in accordance with the above-described embodiment of the present invention. The process begins at block 41 with the set up of a multicast distribution tree structure in a direction from each receiver node to the source root node using a known protocol/algorithm, such as PIM (for IP) or LDP (for MPLS). After the multicast tree has been built, a single branch unicast "tree" is built from each receiver to the source node using the same protocol, with the multicast tree identifier information being provided to each intermediate P node in order to establish the unicast tunnels along the identical path taken by the multicast tree (block 42). As previously discussed, the multicast tree identifier information used to establish the unicast tunnels may be included in a PIM message (for IP) or LDP signaling (for MPLS).

It is appreciated that the above-described tree identifier used to associate the unicast path with a given multicast path may comprise any general identifier used for such association. For example, the identifier can simply identify one of the equal cost paths in an ECMP network. Such an identifier may be used in both the unicast and multicast path setup such that both the unicast and multicast paths will be the same in the presence of ECMP toward the source PE node.

It should be understood that elements of the present invention may also be provided as a computer program product which may include a "machine-readable medium" having stored thereon instructions which may be used to program a computer (e.g., a processor or other electronic device) to perform a sequence of operations. A machine-readable medium" may include any computer program product, apparatus and/or device (e.g., magnetic discs, optical disks, memory, Programmable Logic Devices (PLDs) used to provide machine instructions and/or data to a programmable processor, including a machine-readable medium that receives machine instructions as a machine-readable signal. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, elements of the present invention may be downloaded as a computer program product, wherein the program may be transferred from a remote computer or telephonic device to a requesting process by way of data signals embodied in a carrier wave or other propagation medium via a communication link (e.g., a modem or network connection).

Although the present invention has been described with reference to specific exemplary embodiments, it should be understood that numerous changes in the disclosed embodiments can be made in accordance with the disclosure herein without departing from the spirit and scope of the invention. The preceding description, therefore, is not meant to limit the scope of the invention. Rather, the scope of the invention is to be determined only by the appended claims and their equivalents.

We claim:

1. A method of operation for a provider edge (PE) node of a Multi-protocol label switching (MPLS)/Internet Protocol (IP) core network, comprising:
    issuing a request to join a multicast tree structure, the request being issued in accordance with a protocol along a branch path of the multicast tree structure from the PE node to a source node of the MPLS/IP core network, the branch path passing through one or more intermediate provider (P) nodes of the MPLS/IP core network; and
    issuing a message used to build a unicast path as a single branch tree from the PE node to the source node in accordance with the protocol, the message containing a multicast tree identifier that provides information on the branch path, the information being utilized to align the unicast path with the branch path of the multicast tree structure over the MPLS/IP core network for a given Virtual Private LAN Service (VPLS) instance such that the unicast path passes through the one or more P nodes.

2. The method of claim 1 wherein the protocol comprises the Protocol Independent Multicast (PIM) protocol.

3. The method of claim 1 wherein the multicast tree identifier comprises an IP address.

4. The method of claim 1 wherein the multicast tree identifier comprises a multicast group destination address.

5. A provider edge (PE) node comprising:
    a port for connection with a Multi-protocol label switching (MPLS)/Internet Protocol (IP) core network; and
    a processing unit operable to issue a first message to join a multicast tree routed along a branch path of the multicast tree from the PE node to a source PE node, the branch path passing through one or more intermediate provider (P) nodes of the MPLS/IP core network, and to issue a second message to establish a unicast path as a single branch tree from the PE node to the source PE node, the first and second messages being issued in accordance with a protocol, the second message including information identifying the branch path of the multicast tree, the information being utilized to align the unicast path with the branch path of the multicast tree over the MPLS/IP core network for a given Virtual Private LAN Service (VPLS) instance such that the unicast path passes through the one or more P nodes.

6. The PE node of claim 5 wherein the unicast path comprises a point-to-point tunnel.

7. The PE node of claim 5 wherein the information comprises a multicast group destination address.

8. The PE node of claim 5 wherein the information comprises a Media Access Control (MAC) address.

9. A provider edge (PE) node comprising:
    a port for connection with a Multi-protocol label switching (MPLS)/Internet Protocol (IP) core network; and
    means for issuing a first message to join a multicast tree routed along a branch path of the multicast tree from the PE node to a source PE node, the branch path passing through one or more intermediate provider (P) nodes of the MPLS/IP core network, and for issuing a second message to establish a unicast path as a single branch tree from the PE node to the source PE node, the first and second messages being issued in accordance with a protocol, the second message including information identifying the branch path of the multicast tree, the information being utilized to align the unicast path with the branch path of the multicast tree over the MPLS/IP core network for a given Virtual Private LAN Service (VPLS) instance such that the unicast path passes through the one or more P nodes.

* * * * *